A. FAIRCHILD
Grain-Drill.
No. 59,827.  Patented Nov. 20, 1866.
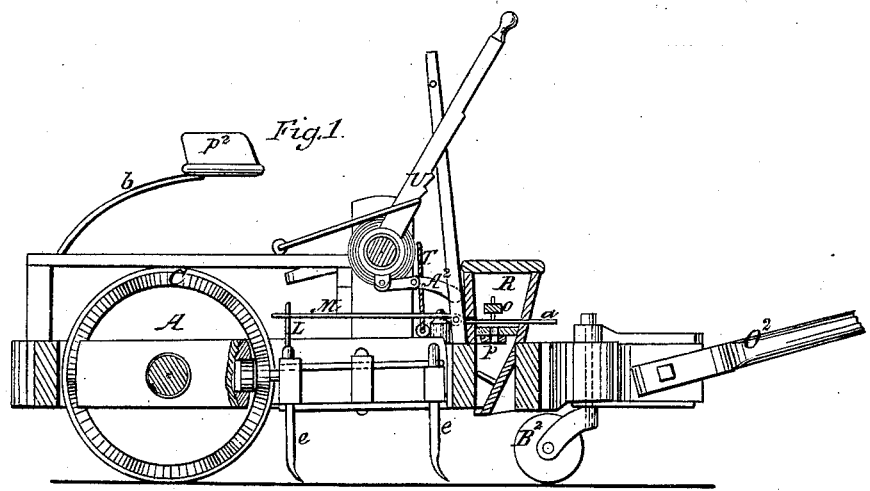
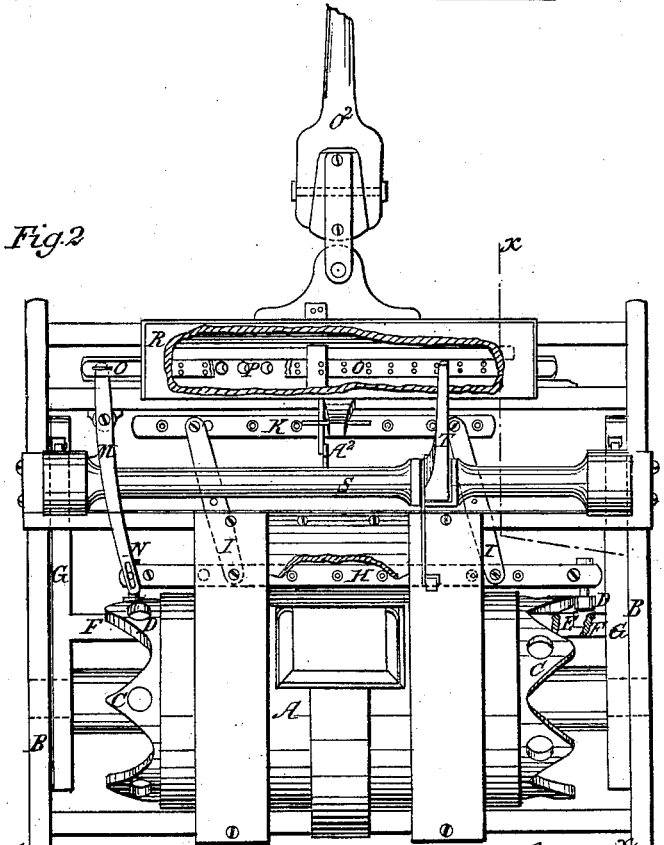

United States Patent Office.

IMPROVEMENT IN COMBINED SEEDER AND HARROW.

ASAHEL FAIRCHILD, OF INDEPENDENCE, IOWA.

Letters Patent No. 59,827, dated November 20, 1866.

SPECIFICATION.

TO ALL WHOM IT MAY CONCERN:

Be it known that I, A. FAIRCHILD, of Independence, in the county of Buchanan, and State of Iowa, have invented a new and improved Combined Seeder, Harrow, and Roller, and I do hereby declare that the following is a full, clear, and exact description thereof, reference being had to the accompanying drawings forming part of this specification.

The nature of this invention consists in combining a field roller and reciprocating harrow with a seeding machine, in such a manner that each machine performs its functions in the most perfect manner.

To enable others skilled in the art to make and use my invention I will proceed to describe its construction and operation:

Figure I is a longitudinal vertical elevation of my combined seeder, harrow, and roller, shown partly in section from the line $x\,x$.

Figure II is a top plan view of the same, with a portion of the hopper removed to show the slide in the bottom of the hopper. Letters of like name and kind refer to like parts in each of the figures.

A is a roller, made of wood or metal, provided at each end with journals that run in suitable bearings in the frame A, which is rectangular in form, and made of wood. Upon each end of the said roller, A, are located cams C C, upon which friction rollers D D work, having a guide roller E, that works in slides F, that are secured to the auxiliary frame G, which is hinged upon the journal of the roller A, the front end of the said frame G, being allowed to work freely up and down.

The journals of the friction rollers D D are secured to the rear harrow-bar H. The said harrow-bar H is connected to pivoted levers I I by a joint, the said levers being pivoted in the centre to the front cross-piece of the auxiliary frame G.

The front ends of these pivoted levers I I are also connected by a joint to another harrow-bar, K. Both of the said harrow-bars run transversely to the line of draught.

Upon one end of the harrow-bar H is a pintle or lever, L, that extends up and engages in a slot, N, in the pivoted lever M, which connects by a pin to both of the agitators O and slide P, that are located in the bottom of the hopper or seed-box R.

S is a rock-shaft which is connected by cords T to the front end of the frame G.

U is a lever, secured to the rock-shaft S, and extends near the driver's seat. This lever U is provided with ratchets, in which a latch, V, works for the purpose of holding up the frame G so as to prevent the harrows from coming in contact with the ground.

To the rock-shaft S is also connected a double-jointed lever, $A^2$, with the slide so that when the harrows are raised by means of the rock-shaft S the slide $a$ is drawn in and closes the openings in the slides so that no grain can escape from the hopper.

$B^2$ is a caster wheel, located at the front end of the frame B, on which it runs.

$O^2$ is the pole to which the team is attached to operate the machine.

$P^2$ is the driver's seat, fastened to a curved spring-brace, $b$, which is secured to the rear end of the frame A.

$e\,e$ are the harrow-teeth, secured to the harrow-beams K and H.

At the rear end of the frame A, and next to the roller, is a scraper for cleaning the roller.

The operation of this combined machine is simple and perfect, sowing the grain broadcast by a deflecting board located at the underside of the hopper or seed-box. The grain is sown evenly, and by the lateral motion of the harrow it is not liable to clog, and covers the grain even, and to any desired depth.

Having thus described my invention, what I claim as new, and desire to secure by Letters Patent of the United States, is—

1. The roller A provided with cams C C, in combination with the harrow-bars H and K, for the purposes, and substantially as described.

2. I claim the separate harrow-bars H and K, pivoted levers I I, in combination with the slotted lever M, and slide P, and agitator O, substantially as described.

3. I claim the combination of the rock-shaft S with the frame G and slide $a$, for the purpose of shutting off the grain when the harrows are raised, substantially as herein set forth.

ASAHEL FAIRCHILD.

Witnesses:
J. H. PLANE,
E. W. BURDICK.